(No Model.)

S. H. RAY.
NUT LOCK.

No. 371,971. Patented Oct. 25, 1887.

WITNESSES:
Fred G. Dieterich
Chas R. Wright

INVENTOR:
Samuel H. Ray
BY Munn & Co
ATTORNEYS.

United States Patent Office.

SAMUEL H. RAY, OF ST. LOUIS, MISSOURI, ASSIGNOR OF ONE-HALF TO GEORGE SAMUEL TYLER, OF ALTON, ILLINOIS.

NUT-LOCK.

SPECIFICATION forming part of Letters Patent No. 371,971, dated October 25, 1887.

Application filed January 31, 1887. Serial No. 226,036. (No model.)

*To all whom it may concern:*

Be it known that I, SAMUEL H. RAY, of St. Louis, in the State of Missouri, have invented a new and useful Improvement in Nut-Locks, of which the following is a specification.

The object of my invention is to furnish an improved nut-lock, which will effectually prevent any backward movement or loosening of the nut, and which can be easily and readily applied.

The invention consists of a nut having an eccentric-groove, a washer having a flange projecting over the nut, and a key fitting in the groove of the nut and engaging the flange of the washer.

The invention also consists in the peculiar construction and arrangement of parts, as hereinafter fully described, and pointed out in the claims.

Figure 1:
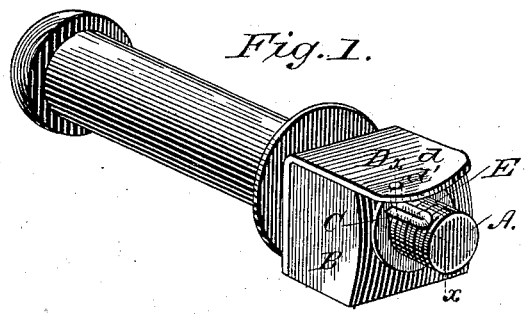
Figure 2:
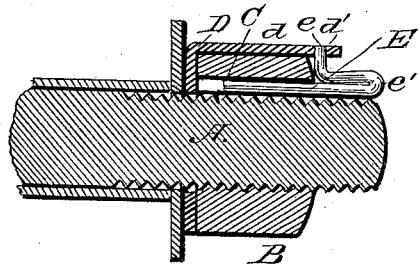
Figure 3:
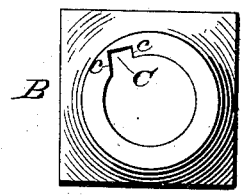
Figure 4:
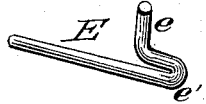

Reference being had to the accompanying drawings, in which similar letters of reference indicate corresponding parts in all of the figures, Figure 1 is a perspective view of my improvement. Fig. 2 is a section on line $x\ x$ of Fig. 1. Fig. 3 is a plan view of the nut. Fig. 4 is a perspective view of the key.

A is a bolt; B, the nut provided with the groove C, extending entirely through the same, and having its walls $c\ c'$ of unequal height, thus forming a groove eccentric to the central aperture of the nut.

E is a washer, preferably of spring metal, fitting on the bolt and having a flange, $d$, projecting over and beyond the nut and provided with an aperture, $d'$, in the portion projecting beyond the nut.

E is a key consisting of a piece of wire bent upon itself, as shown, and having its end bent upward to form a finger, $e$. By thus forming the key the end $e'$ is stiffened, and forms a head for driving the key in the groove and a means whereby the key can be removed.

The operation is as follows: The nut having been screwed to a bearing upon the bolt, the washer having been previously put on the nut, the key, which is of slightly greater diameter than the depth of the groove, is driven into the groove of the nut, when the finger of the key is sprung into the aperture of the flange of the washer, as shown in the drawings, thereby locking the nut on the bolt and the key in the groove.

Owing to the shape of the groove in the nut, any tendency of the nut to unscrew is arrested by the binding of the key against the threads of the bolt, and the greater the force applied to unscrew the nut the more firmly is the key bound against the threads of the bolt and the nut locked in place. By the engagement of the key with the washer it is firmly locked in position and all danger of its coming out is effectually prevented. The groove can be cut in the nut at any point, either opposite the faces of the nut or at the corner, as shown. The groove can be punched at the same time the hole is punched, or it can readily be cut after the nut has been finished.

I am aware that a nut having an eccentric-recess to receive a spring-pressed locking-dog is old.

Having thus described my invention, what I claim, and desire to secure by Letters Patent, is—

1. In a nut-lock, the combination, with a nut having an eccentric groove, of a washer having a forwardly-projecting flange, and a key fitting in the groove of the nut and engaging the flange of the washer, substantially as herein shown and described.

2. In a nut-lock, the combination, with a nut having an eccentric groove, of a washer having a forwardly-projecting and apertured flange, and a key fitting the groove of the nut and provided with an upwardly-projecting finger engaging the aperture of the flange of the washer, substantially as herein shown and described.

SAMUEL H. RAY.

Witnesses:
   WM. RUINE, Jr.,
   BEN WISSELL.